US011634604B2

(12) United States Patent
Madduri et al.

(10) Patent No.: US 11,634,604 B2
(45) Date of Patent: Apr. 25, 2023

(54) POLYSACCHARIDE COMPOSITIONS AND PARTICULATE MATERIALS COATED THEREWITH

(71) Applicant: Integrity Bio-Chemicals, LLC, Cresson, TX (US)

(72) Inventors: Ashoka V. R. Madduri, Columbus, GA (US); Christopher P. Gardner, Columbus, GA (US); Sanket Gandhi, Columbus, GA (US); Matthew B. Blackmon, Columbus, GA (US); Charles R. Landis, The Woodlands, TX (US); Curtis J. Rodencal, Midland, GA (US)

(73) Assignee: Integrity Bio-Chemicals, LLC, Cresson, TX (US)

( * ) Notice: Subject to any disclaimer, the term of this patent is extended or adjusted under 35 U.S.C. 154(b) by 903 days.

(21) Appl. No.: 16/490,983

(22) PCT Filed: Mar. 7, 2018

(86) PCT No.: PCT/US2018/021305
§ 371 (c)(1),
(2) Date: Sep. 4, 2019

(87) PCT Pub. No.: WO2018/165267
PCT Pub. Date: Sep. 13, 2018

(65) Prior Publication Data
US 2020/0010711 A1  Jan. 9, 2020

Related U.S. Application Data

(60) Provisional application No. 62/468,142, filed on Mar. 7, 2017.

(51) Int. Cl.
| *A01K 1/015* | (2006.01) |
|---|---|
| *C09D 105/02* | (2006.01) |
| *B22C 1/26* | (2006.01) |
| *C04B 41/00* | (2006.01) |
| *C04B 41/45* | (2006.01) |
| *C04B 41/48* | (2006.01) |
| *C08B 37/02* | (2006.01) |
| *C09K 8/80* | (2006.01) |

(52) U.S. Cl.
CPC .......... *C09D 105/02* (2013.01); *A01K 1/0154* (2013.01); *A01K 1/0155* (2013.01); *B22C 1/26* (2013.01); *C04B 41/009* (2013.01); *C04B 41/4584* (2013.01); *C04B 41/4803* (2013.01); *C08B 37/0021* (2013.01); *C09K 8/805* (2013.01)

(58) Field of Classification Search
CPC ... A01K 1/0154; A01K 1/0155; A01K 1/0152
See application file for complete search history.

(56) References Cited

U.S. PATENT DOCUMENTS

| 5,128,390 | A | 7/1992 | Murphey | |
|---|---|---|---|---|
| 5,359,961 | A | 11/1994 | Goss et al. | |
| 2003/0148100 | A1 | 8/2003 | Greene et al. | |
| 2006/0088498 | A1* | 4/2006 | Martin | A23K 20/105 424/490 |
| 2009/0000562 | A1* | 1/2009 | Jenkins | A01K 1/0154 119/173 |
| 2012/0279704 | A1* | 11/2012 | Eoff | C09K 8/5751 166/280.1 |
| 2013/0305997 | A1* | 11/2013 | Miller | A01K 1/0154 119/173 |
| 2014/0165921 | A1 | 6/2014 | Raymond et al. | |
| 2016/0135421 | A1* | 5/2016 | Cortner | A01K 1/0155 119/172 |
| 2018/0228124 | A1* | 8/2018 | Donald | A01K 1/0154 |
| 2018/0229218 | A1* | 8/2018 | Jollez | B01J 20/28073 |
| 2019/0117823 | A1* | 4/2019 | Jollez | B01J 20/321 |

FOREIGN PATENT DOCUMENTS

WO  2018165267 A1  9/2018

OTHER PUBLICATIONS

EP Supplementary Search Report and Search Opinion dated Mar. 29, 2021.
ISR/WO for PCT/US2018/021305 dated Jun. 29, 2018.

* cited by examiner

*Primary Examiner* — Kristen C Hayes
(74) *Attorney, Agent, or Firm* — Vorys, Sater, Seymour and Pease LLP

(57) ABSTRACT

Loose particulate materials can be problematic in various aspects. For example, loose particulate materials may generate dust or be difficult to consolidate together. Fines in loose particulate materials may also be an issue. Coated particulates may alleviate some of the foregoing issues. Suitable coated particulates may comprise a particulate material comprising sand or a ceramic, and a polysaccharide composition coated upon the particulate material, the polysaccharide composition comprising a functionalized polysaccharide. Other particulate materials such as wood chips and animal litter particulates may be coated with functionalized polysaccharides to achieve similar advantages.

11 Claims, No Drawings

POLYSACCHARIDE COMPOSITIONS AND PARTICULATE MATERIALS COATED THEREWITH

CROSS-REFERENCE TO RELATED APPLICATIONS

The present application claims the benefit of priority under 35 U.S.C. § 119 from U.S. Provisional Patent Application 62/468,142, filed on Mar. 7, 2017 and incorporated herein by reference in its entirety.

STATEMENT REGARDING FEDERALLY SPONSORED RESEARCH OR DEVELOPMENT

Not applicable.

BACKGROUND

Manipulation and use of particulate materials can be complicated in many instances by the presence of fine particles ("fines") within a plurality of particulates having a larger average size on the whole. Although fines may sometimes be problematic from a functional standpoint, they do not necessarily compromise the overall operational performance of the larger-size particulate materials. However, fines can lead to safety and/or nuisance issues when manipulating particulate materials. Specifically, fines can be aerosolized as "dust" particles, which can be highly undesirable. Aerosolized dust particles can represent a significant inhalation and/or fire hazard, which may present significant engineering challenges, especially for large-scale manipulations.

Although particulate materials may be sorted to remove fines or to limit the amount of fines, sorting or sizing can be a complex and expensive process. Moreover, in some instances, fines may desirably improve upon the operational performance of the larger-size particulate materials. For example, fines may at least partially fill void space between the larger-size particulate materials, which can be desirable in certain instances. Even when fines fulfill a desirable function, such as the foregoing one, they may still be operationally challenging for the reasons noted above. As such, a wide array of consumer and industrial products may benefit from the mitigation of fines.

One approach for mitigating the presence of fines involves applying a coating to a particulate material, thereby tempering the ability of the fines to aerosolize. Certain coating materials are not especially environmentally benign, however, and some may compromise the operational performance of the larger-size particulate materials. Added expense of the coating material may also be a concern in certain situations.

BRIEF DESCRIPTION OF THE DRAWINGS

Not applicable.

DETAILED DESCRIPTION

The present disclosure generally describes coated particulates and, more specifically, particulate materials having a coating that facilitate manipulation and use thereof.

As discussed above, the fines in particulate materials can be subject to aerosol formation during particulate manipulation and use, thereby leading to nuisance dust formation and/or other safety hazards. One approach for addressing aerosol formation and other detrimental effects of fines includes applying a coating to a particulate material, including both fines and larger-size particulates. However, coatings can sometimes undesirably impact the operational performance of particulate materials. In addition, some coatings can be expensive and/or have an undesirable environmental profile.

The present disclosure provides coating compositions for particulate materials that may alleviate at least some of the above-described difficulties. More particularly, the present disclosure provides polysaccharide compositions containing a functionalized polysaccharide as a coating substance for various types of particulate materials. The polysaccharide compositions may fulfill a variety of functions, including mitigating the presence of fines and/or binding the particulates together with one another. Advantageously, the functionalized polysaccharides, being derived from non-toxic biological sources, may have a relatively benign environmental profile, thereby allowing their use in applications where other types of coating compositions are either problematic or undesirable.

In addition to helping mitigate the presence of fines, functionalized polysaccharides may themselves possess desirable properties for various types of applications. For example, functionalized polysaccharides of the present disclosure may independently impart desirable properties to a system such as metal chelation, friction reduction, surfactant stabilization, surface tension reduction, clay swelling reduction, and the like. In some cases, the particulate materials may serve as a carrier to transport the functionalized polysaccharides into a desired locale, where their properties may be expressed in a certain way depending upon the local conditions that are present in the environment immediately surrounding the particulates.

Moreover, in some configurations, the polysaccharide compositions of the present disclosure may be formulated as binder compositions that may contain further components in addition to the functionalized polysaccharide. In addition to mitigating the presence of fines, the further components may aid in consolidating or adhering individual particulates together and/or increasing the mechanical strength of individual particulates, which can be desirable in applications where increased mechanical robustness is desirable, for example. Applications in which mechanical robustness may be desirable include, but are not limited to, cement blending and mineral pelleting, for example. In some embodiments, suitable further components may include a clay material, such as a bentonite clay. Use of a clay material is not believed to unfavorably impact the desirable environmental profile of the polysaccharide compositions disclosed herein.

The polysaccharide compositions disclosed herein may be employed advantageously in a wide array of applications where particulate materials are used, especially those in which dust control and mitigation of other issues associated with fines are desirable. In addition, the desirable properties afforded by functionalized polysaccharides themselves can further enhance certain types of applications as well. Several illustrative applications are described in brief hereinafter that may be advantageously conducted using the polysaccharide compositions of the present disclosure as a coating for particulate materials.

One application in which the polysaccharide compositions of the present disclosure may afford particular benefits is during subterranean wellbore operations, such as during fracturing operations conducted above the fracture gradient pressure of a subterranean formation penetrated by the wellbore. When disposed in a subterranean wellbore, the functionalized polysaccharides may aid in, for example, reducing friction and/or improving reservoir water chemistry management. Advantageously, proppant particulates, upon which the polysaccharide compositions are coated according to certain embodiments of the present disclosure, may serve as a robust carrier for conveying the functionalized polysaccharides into a desired location within the wellbore, such as within a fracture network in the subterranean formation. In contrast to conventional subterranean wellbore operations, in which a treatment chemical is contacted with a subterranean formation at a later time following fracturing, proppant particulates coated with a polysaccharide composition of the present disclosure may allow treatment (i.e., chemical modification of a subterranean surface) to begin concurrently as the proppant particulates become distributed within a fracture network. As such, the functionalized polysaccharides may exert their desirable properties upon the subterranean formation more quickly and with more precise localization than would otherwise be possible in a separate wellbore operation. Other types of subterranean wellbore operations in which particulate materials are used, such as fluid loss control operations, for example, may similarly benefit from the utilization of particulate materials coated with the polysaccharide compositions disclosed herein. Control of aerosol formation by using the presently disclosed polysaccharide compositions as a coating upon these other types of wellbore particulate materials may be highly desirable as well.

In another illustrative application, foundry sand having a coating of the polysaccharide compositions disclosed herein may also be especially advantageous. Foundry sand is used a moulding material for casting molten metals, such as molten iron or molten aluminum, for example. Advantageously, the polysaccharide compositions of the present disclosure may aid in holding the foundry sand particles together in a foundry mould, thereby facilitating assembly of the foundry mould and increasing its robustness. Moreover, since the polysaccharide compositions of the present disclosure allow fines to be maintained in the coated particulate materials (advantageously without promoting dust formation), the fines from coated foundry sand may settle in the void space between larger coated particles when forming a foundry mould. As such, the coated fines may increase the density of the moulds and aid in preventing leakage of the molten metal through the mould's porosity. Polysaccharide compositions comprising a clay material or other suitable binder substance compatible with high-temperature processing conditions may be particularly desirable for use in conjunction with functionalized polysaccharides for coating foundry sands. Functionalized polysaccharides "burned off" the foundry sand particles during the casting process may be freshly readily re-applied to affect particle regeneration for subsequent casting processes, according to some embodiments of the present disclosure. Moreover, the polysaccharide compositions of the present disclosure may be used in lower amounts than are traditional binder materials for foundry sand, thereby decreasing the amount of slag formed from the foundry sand during a moulding process.

Although particular advantages of coated proppant particulates and coated foundry sand have been described hereinabove, it is to be appreciated that the polysaccharide compositions of the present disclosure may be advantageous for coating other types of particulate materials as well. For example, the polysaccharide compositions of the present disclosure may be advantageous for treating or coating other types of particulate materials that are prone to the formation of nuisance dust during manipulation or use. Illustrative materials that may benefit from applied coatings of the polysaccharide compositions disclosed herein include, for example, animal litter and wood products. In the case of coating animal litter particulates with a polysaccharide coating, nuisance dust near a litter box may be advantageously reduced. Keeping fines together in wood products, including modified wood products such as charcoal, may advantageously increase pellet density when compacting wood particulates together, such as for home heating and outdoor grilling applications, thereby increasing the overall heat given off per unit weight of wood product, in addition to mitigating nuisance dust as well. The polysaccharide compositions of the present disclosure may also be advantageous for use in conjunction with mineral pelleting and concrete blending applications, for example, wherein they may coat various particulate materials therein and potentially alter their properties.

In some embodiments, coated particulates of the present disclosure may comprise a particulate material comprising sand or a ceramic, and a polysaccharide composition coated upon the particulate material, in which the polysaccharide composition comprises a functionalized polysaccharide. Suitable functionalized polysaccharides for use in the present disclosure are described in greater detail hereinbelow.

Coatings comprising the polysaccharide compositions disclosed herein may be continuous or discontinuous upon the outer surface of an individual particulate. As such, coatings of the polysaccharide compositions may be complete or partial upon a given particulate material. Moreover, in a plurality of particulates, all of the particulates need not necessarily be coated with a polysaccharide composition in order to realize the benefits described herein.

Suitable particulates comprising sand or a ceramic are not considered to be especially limited. Sand or ceramics may be of any grade, particle size, and/or purity, and fines may be present in either type of particulate. Foundry sand may be the particulate material, according to some more specific embodiments of the present disclosure. For purposes of the present disclosure, the term "ceramics" refers to one or more metal oxides, and/or one or more non-oxides that are considered to be ceramics, such as carbides, borides, nitrides, and/or silicides. As such, the term "ceramic" includes glass materials, oxide ceramic materials, and/or non-oxide ceramic materials. Suitable ceramics may be non-crystalline, crystalline, and/or partially crystalline in morphology.

Accordingly, foundry moulds are also envisioned by the present disclosure. Such foundry moulds may comprise the foundry sand described herein, in which a moulding pattern is defined in the foundry sand within the foundry mould. Suitable moulding patterns are not considered to be particularly limited. The foundry sand may be further retained within a retaining case suitable to allow a molten metal to be applied to the mould. The retaining case may be removed to allow removal of a cast article and/or for recycling or regeneration of the foundry sand to take place.

Particulate materials other than sand and ceramics may be coated with a polysaccharide composition of the present disclosure, according to other various embodiments. In some embodiments, suitable particulate materials may be a clay material, including vermiculite, montmorillonite or bentonite, for example. In still other various embodiments, suitable particulate materials may comprise wood products, including shavings, sawdust, bark, chips and the like, one or more of which may be compressed together in a pellet in some applications. Processed wood particulate materials such as charcoal particulates, for example, may also be suitably used in conjunction with the polysaccharide compositions disclosed herein, according to some embodiments. Any of these coated particulate materials may comprise an animal litter product or a portion thereof, according to some embodiments of the present disclosure.

Polysaccharides and functionalized polysaccharides suitable for use in the various embodiments of the present disclosure are environmentally safe, substantially nonhazardous to work with, and generally biocompatible. Polysaccharides such as dextran, levan and guar, for example, as well as their functionalized forms, are also biodegradable and pose little to no threat to the environment, even when used in high concentrations in the polysaccharide compositions disclosed herein. In addition, these polysaccharides may be sourced or produced at relatively low cost.

The various polysaccharide compositions described hereinafter may be used in conjunction with any of the particulate materials described herein including, for example, wood products (including charcoal particulates), sand, foundry sand, clay particulates, animal litter particulates, mineral particulates, concrete aggregate particulates, and the like. It is to be appreciated that particular formulations of the polysaccharide compositions may be chosen in response to the given type of particulate material being coated, as well as the intended application of the coated particulates. For example, when a stronger chemical bonding interaction is desired between a functionalized polysaccharide and a particulate material or the environment surrounding a coated particulate material, a functionalized polysaccharide comprising a heteroatom functional group, such as an amino group or a carboxylic acid group, may be more desirable. When stronger physical interactions between adjacent particulates are more desirable, for example, polysaccharide compositions formulated to promote binding, such as those comprising a clay material or other binder material may be utilized. In addition, polysaccharide compositions comprising functionalized polysaccharides that are crosslinked, particularly intermolecularly crosslinked, may be desirable when mechanical robustness is needed.

Suitable polysaccharides that may undergo functionalization for use in the polysaccharide compositions disclosed herein include, for example, levan, dextran, guar (guar gum), scleroglucan, welan, pullulan, xanthan (xanthan gum), schizophyllan, cellulose, and any combination thereof. Dextran, levan and guar may be particularly desirable polysaccharides for use in the various polysaccharide compositions disclosed herein. Derivative forms of the foregoing polysaccharides may be used as well, and such derivative forms may undergo the types of further functionalization described hereinafter. Guar derivatives suitable for use in the various embodiments of the present disclosure may include, for example, carboxyalkyl or hydroxyalkyl derivatives of guar, such as, for example, carboxymethyl guar, carboxymethylhydroxyethyl guar, hydroxyethyl guar, carboxymethylhydroxypropyl guar, ethyl carboxymethyl guar, and hydroxypropylmethyl guar. Suitable dextran and levan derivatives may similarly include, for example, carboxyalkyl or hydroxyalkyl derivatives of dextran or levan, such as, for example, carboxymethyl dextran (levan), carboxymethylhydroxyethyl dextran (levan), hydroxyethyl dextran (levan), carboxymethylhydroxypropyl dextran (levan), ethyl carboxymethyl dextran (levan), and hydroxypropylmethyl dextran (levan).

Polysaccharides suitable for use in the embodiments of the present disclosure may encompass a wide range of molecular weights. In illustrative embodiments, the molecular weight of suitable polysaccharides may range between about 1 million and about 50 million Daltons. In more specific embodiments, the polysaccharide molecular weight, particularly for levans, may range between about 1 million and about 5 million Daltons, or between about 3 million and about 10 million Daltons, or between 5 million and about 10 million Daltons, or between 10 million and about 20 million Daltons, or between 20 million and about 30 million Daltons, or between 30 million and about 40 million Daltons, or between 40 million and about 50 million Daltons.

In some embodiments, the polysaccharide compositions of the present disclosure may comprise a partially oxidized polysaccharide. Such partially oxidized polysaccharides may be formed from a parent polysaccharide comprising a plurality of monosaccharide rings that are polymerized together through glycosidic bonds. In the partially oxidized polysaccharides, at least a portion of the monosaccharide rings are oxidatively opened (i.e., to an acyclic form), and the glycosidic bonds remain intact.

In illustrative embodiments, partially oxidized polysaccharides may be formed through an oxidation of a vicinal diol upon the monosaccharide rings into an acyclic dialdehyde. Reagents such as sodium periodate, for example, may be suitable to perform such selective oxidation reactions without cleaving the glycosidic bonds along the polymer backbone. The dialdehdye may then be converted into a secondary amine functionality through reductive amination, according to various embodiments of the present disclosure. As such, partially oxidized polysaccharides suitable for use in the present disclosure may be functionalized with one or more amine groups at a site of oxidative opening, according to various embodiments. The amine groups at the site of oxidative opening may be secondary amine groups, but they may be tertiary amine groups in some cases.

Scheme 1 below shows the process through which a monosaccharide ring may be oxidatively opened (e.g. via a sodium periodate oxidation) and then undergo conversion by reductive amination (e.g., by reaction of the dialdehyde with an amine in the presence of a reducing agent, such as sodium borohydride), according to various embodiments of the present disclosure. It is to be appreciated that the monosaccharide ring configuration depicted in Scheme 1 is illustrative and non-limiting. The R group in Scheme 1 is a hydrocarbyl group, which may be substituted or unsubstituted, linear or branched, and cyclic, acyclic, or aromatic.

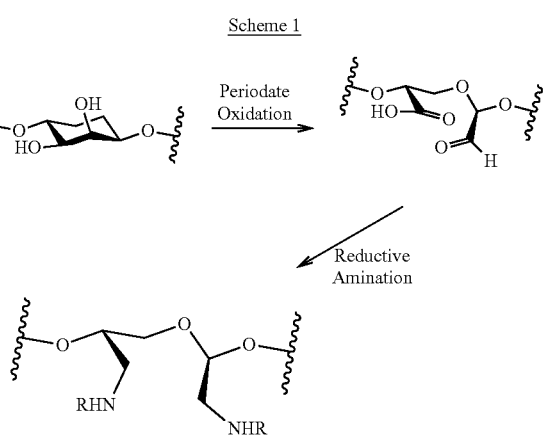

Scheme 1

Moreover, both of the aldehyde groups in the intermediate dialdehyde need not necessarily undergo conversion into an amine, as depicted in Scheme 1. According to various embodiments of the present disclosure, the site of oxidative opening in a partially oxidized polysaccharide may comprise from zero to two amine groups. When both aldehydes of the dialdehyde undergo reductive amination, two amine groups are present. In contrast, when zero or one amine groups are present, one or both of the aldehyde groups are instead reduced to primary alcohols rather than reacting with the amine. On the whole, about 10 percent or more of the monosaccharide units (counting both non-oxidized and oxidatively opened monosaccharide units) in the polysaccharide may be coupled to an amine group.

In more particular embodiments, the amine groups bonded to a partially oxidized polysaccharide may be secondary alkyl amines, which are introduced during reductive amination through the reaction of a primary alkyl amine. Any of monoamines, diamines, triamines, tetraamines, or even higher polyamines may be bonded to the site of oxidative opening, according to various embodiments. The primary alkyl amine may comprise a hydrocarbyl group (corresponding to R in Scheme 1), which becomes bonded to the secondary amine group within the functionalized polysaccharide. The hydrocarbyl group may also be bonded to an additional amine group in diamine and higher polyamine compounds, where the additional amine group is tethered to the site of oxidative opening by the hydrocarbyl group.

Formulas 1-3 below show illustrative structures of partially oxidized polysaccharides bearing amine groups at the site of oxidative opening, which may be suitable for use in the polysaccharide compositions disclosed herein. Formula 1 shows an amine-functionalized, partially oxidized dextran, Formula 2 shows an amine-functionalized, partially oxidized levan, and Formula 3 shows an amine-functionalized, partially oxidized guar. It is to be appreciated that the structures shown in Formulas 1-3 are illustrative and non-limiting. For example, the monosaccharide ring undergoing oxidative opening, the site of oxidative opening, the extent of oxidative opening, and the particular amine being incorporated may vary from that depicted. Moreover, although Formulas 1-3 have shown one amine becoming bonded to the site of oxidative opening (i.e., the second aldehyde of the dialdehyde being reduced to a primary alcohol), it is to be appreciated that two bonded amines may be present under forcing reaction conditions. It is to be further appreciated that some sites of oxidative opening may lack an amine functionality, according to some embodiments.

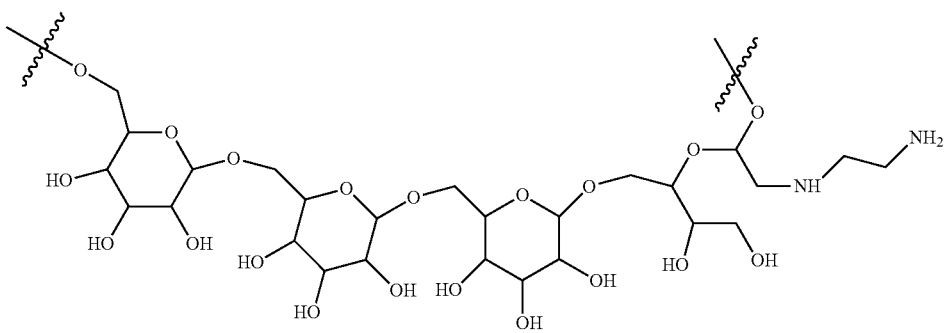

Formula 1

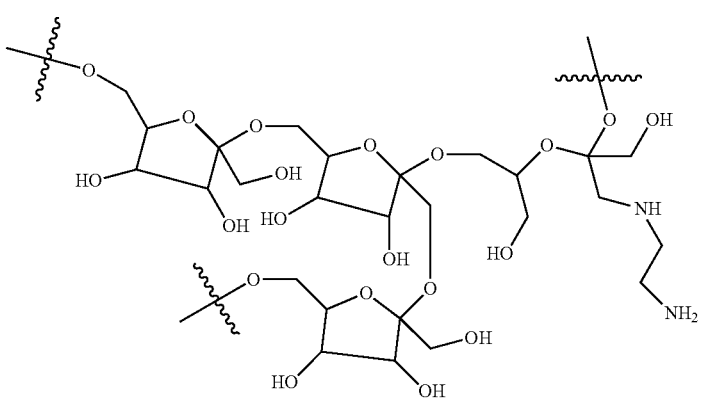

Formula 2

-continued

Formula 3

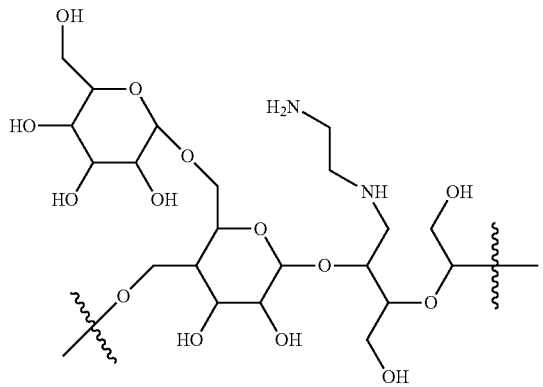

The partially oxidized polysaccharides described hereinabove may be combined with a clay material in some embodiments of the polysaccharide compositions described herein. In some embodiments, the clay material may comprise a bentonite clay, a montmorillonite clay, or any combination thereof. When present, clay materials, particularly bentonite clay, may be present in the polysaccharide compositions disclosed herein in any non-zero amount that is about 30 wt. % or less, or about 25 wt. % or less, or about 20 wt. % or less, or about 15 wt. % or less, or about 10 wt. % or less, or about 5 wt. % or less, or about 2 wt. % or less. In other embodiments, the clay materials may be present in the polysaccharide compositions in an amount of about 70 wt. % or above, or about 75 wt. % or above, or about 80 wt. % or above, or about 85 wt. % or above, or about 90 wt. % or above, or about 95 wt. % or above, or about 97 wt. % or above. The specific particulate material being blended in the polysaccharide compositions may play a role in determining an effective amount of clay material to include.

In other illustrative embodiments, functionalized polysaccharides suitable for use in the polysaccharide compositions described herein may comprise a polysaccharide in which an amine group has been introduced to a monosaccharide ring without partially oxidizing the parent polysaccharide. In illustrative embodiments, functionalized polysaccharides of this type may be formed by reacting a parent polysaccharide with a reagent bearing an amine or amine precursor in combination with a reactive functionality, such as an epoxide or a halide leaving group. In such embodiments, the backbone (glycosidic bonds) and side chain structure of the parent polysaccharide remains intact, and the amine groups are bonded through an ether linkage formed from pendant hydroxyl groups via a hydrocarbyl spacer in the functionalized polysaccharide. Amines incorporated in this manner may reside at the terminus of the hydrocarbyl spacer, in some embodiments, or they may be internal within the hydrocarbyl spacer in other embodiments. The incorporated amines may be any of primary amines, secondary amines, tertiary amines, or quaternized amines (e.g., tetraalkylammonium salts). Other heteroatom functionality may be present within the hydrocarbyl spacer as well, according to some embodiments.

Formulas 4-6 below show some illustrative structures of functionalized polysaccharides that may be suitable for use in the polysaccharide compositions disclosed herein, in which an amine group is bonded via a hydrocarbyl spacer through an ether linkage to a parent polysaccharide. Formula 4 shows an amine-functionalized dextran, Formula 5 shows an amine-functionalized levan, and Formula 6 shows an amine-functionalized guar. In such structures, the monosaccharide units remain intact and undergo functionalization upon the pendant hydroxyl groups. It is to be recognized that the incorporated amine group need not necessarily extend from the depicted pendant hydroxyl group, nor is the manner of bonding limited to that depicted. Moreover, although Formulas 4-6 have shown one amine being bonded to the polysaccharide through an intervening ether linkage formed from a pendant hydroxyl group, it is to be appreciated that more than one amine may be bonded in other cases.

Formula 4

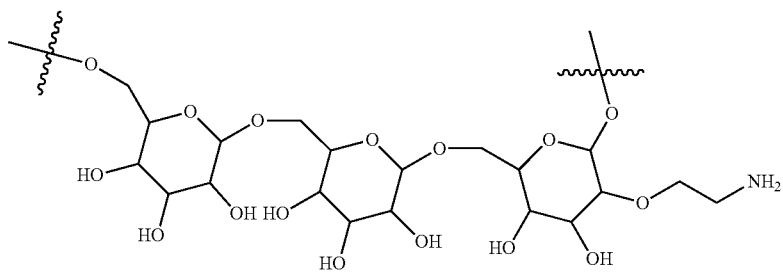

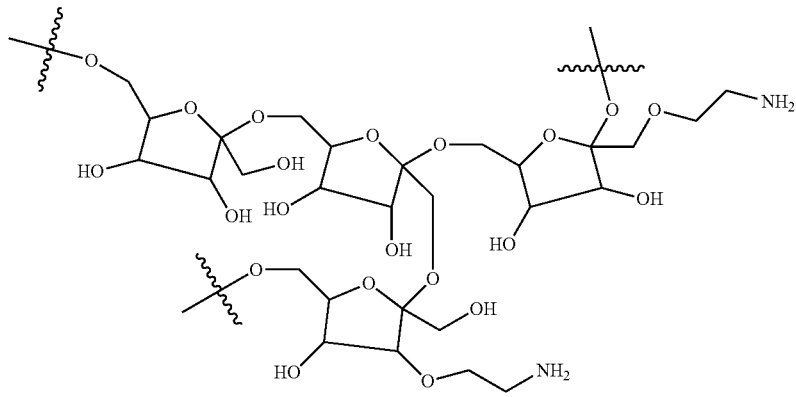

Formula 5

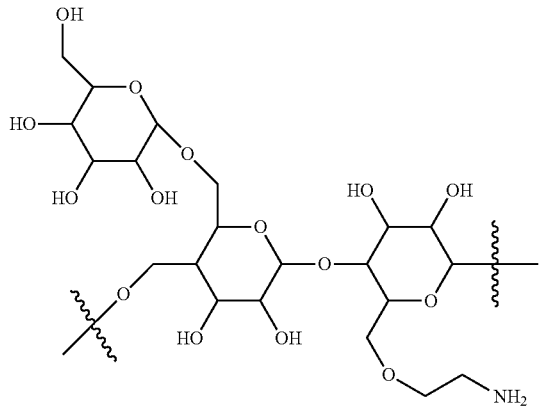

Formula 6

Functionalized polysaccharides bearing an amine group upon a non-oxidized parent polysaccharide may likewise be combined with a clay material in certain polysaccharide compositions of the present disclosure. In some embodiments, the clay material may comprise a bentonite clay, a montmorillonite clay, or any combination thereof. Clay materials may be combined with the functionalized polysaccharide in the amounts and/or ratios listed above for partially oxidized polysaccharides. Accordingly, when present, clay materials, particularly bentonite clay, may be present in the polysaccharide compositions disclosed herein in any non-zero amount that is about 30 wt. % or less, or about 25 wt. % or less, or about 20 wt. % or less, or about 15 wt. % or less, or about 10 wt. % or less, or about 5 wt. % or less, or about 2 wt. % or less. In other embodiments, the clay materials may be present in the polysaccharide compositions in an amount of about 70 wt. % or above, or about 75 wt. % or above, or about 80 wt. % or above, or about 85 wt. % or above, or about 90 wt. % or above, or about 95 wt. % or above, or about 97 wt. % or above.

According to still other illustrative embodiments of the present disclosure, polysaccharide compositions may comprise a crosslinked polysaccharide, in which the crosslinked polysaccharide may comprise at least one crosslinking group that is bonded via a first ether linkage to a first polysaccharide chain and via a second ether linkage to a second polysaccharide chain (i.e., intermolecular crosslinking). Additional details concerning the crosslinking group and techniques for forming crosslinks between the first and second polysaccharide chains is provided hereinbelow. Crosslinking may also be intramolecular, according to some or other embodiments.

In illustrative embodiments, the first and second polysaccharide chains in a crosslinked polysaccharide may be crosslinked to one another through their reaction with a bis-epoxide or a halohydrin, such as epichlorohydrin. In illustrative embodiments, the crosslinking group may comprise an alkyl moiety, optionally having one or more side chain hydroxyl groups or other side chain heteroatom functionality, extending between the first and second polysaccharide chains via the first and second ether linkages. According to various embodiments, the crosslinking group may be a hydrocarbyl group comprising 2 to about 10 carbon atoms that extends between the first and second polysaccharide chains.

In more specific embodiments, the crosslinking group may comprise a reaction product of epichlorohydrin or a similar $C_3$ halohydrin with the first polysaccharide chain and the second polysaccharide chain. In various embodiments, the reaction product of epichlorohydrin may comprise a $C_3$ alkyl moiety having a side chain hydroxyl group, specifically a hydroxyl group located upon the central carbon atom of the $C_3$ carbon chain. Scheme 2 below shows a generic reaction scheme in which epichlorohydrin is used to affect polysaccharide crosslinking. Although Scheme 2 has shown the crosslinking as occurring between a primary hydroxyl group located upon the first and second polysaccharide chains, it is to be appreciated that the secondary hydroxyl groups may be involved in crosslinking in some instances.

Scheme 2

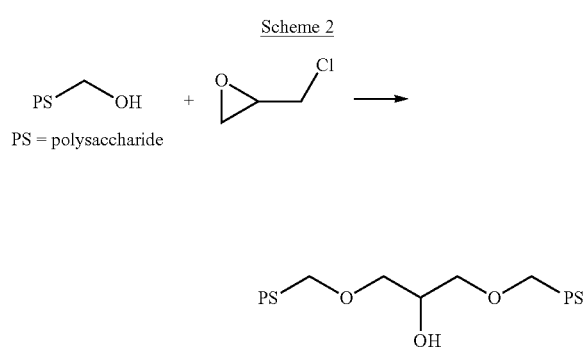

In various embodiments, crosslinked polysaccharides of the present disclosure may be produced by reacting a parent polysaccharide with epichlorohydrin in a basic solution at a temperature ranging from about 50° C. to 100° C. for several hours. About 1 percent to about 90 percent of the available hydroxyl groups in the parent polysaccharide may undergo functionalization to form crosslinks in this process, In more specific embodiments, about 1 percent to about 20 percent of the hydroxyl groups may undergo a crosslinking reaction, or between about 20 percent to about 50 percent of the hydroxyl groups, or between about 50 percent and about 70 percent of the hydroxyl groups, or between about 70 percent to about 90 percent of the hydroxyl groups. In some embodiments, an even greater extent of crosslinking may take place, with up to substantially 100 percent of the available hydroxyl groups undergoing functionalization. The extent of crosslinking may be dictated by the stoichiometric amount of epichlorohydrin that is present. Moreover, the extent of crosslinking may be used to tailor the resultant properties of the polysaccharide compositions and coated particulates formed therefrom.

Various polysaccharides may be crosslinked using the crosslinking chemistry disclosed herein. Particular polysaccharides are not considered to be especially limited and, in some embodiments, may include polysaccharides such as levan, dextran, guar, scleroglucan, welan, pullulan, xanthan, schizophyllan, cellulose, or any combination thereof. Suitable derivative forms of these and similar polysaccharides may be crosslinked as well. In more particular embodiments, the crosslinked polysaccharide may comprise a crosslinked levan, a crosslinked dextran, a crosslinked guar, or any combination thereof. Dextrans and levans suitable for crosslinking or functionalization according to the disclosure herein may be obtained from any source or prepared by any technique including synthetically, fermenting, and the like.

Scheme 3 below shows an illustrative reaction process whereby levan may undergo crosslinking with epichlorohydin (EPCH), in a manner similar to that outlined generically in Scheme 2 above. As shown, the reaction product of epichlorohydrin with levan introduces a $C_3$ alkyl group appended to a first levan chain via a first ether linkage (i.e., at the $C_1$ carbon of the crosslinking group) and to a second levan chain via a second ether linkage (i.e., at the $C_3$ carbon of the crosslinking group). The $C_2$ carbon of the crosslinking group bears a secondary hydroxyl group, which is formed upon opening the epoxide ring. As depicted, the crosslinking group extends between branching fructose monosaccharide units depending from the main chain. It is to be recognized, however, that this represents but one possible regioisomer of the depicted crosslinking chemistry. In illustrative embodiments, the crosslinking groups may extend between main chain monosaccharide units, between main chain and branching monosaccharide units, between branching monosaccharide units, or any combination thereof. As such, the particular crosslinking motif shown in Scheme 3 should be considered illustrative and non-limiting.

Scheme 3

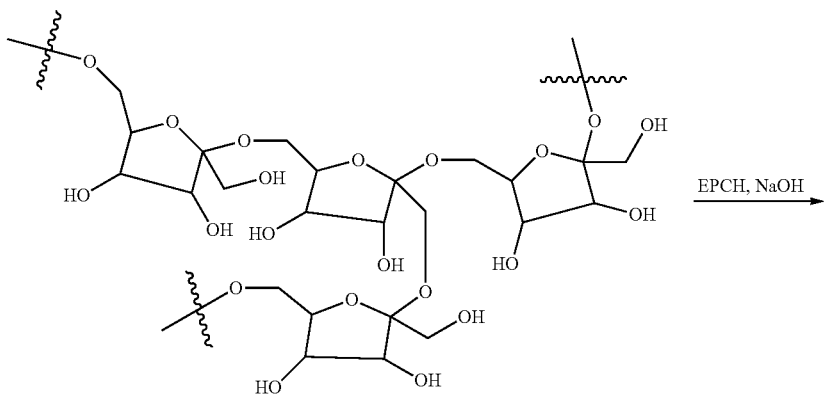

-continued

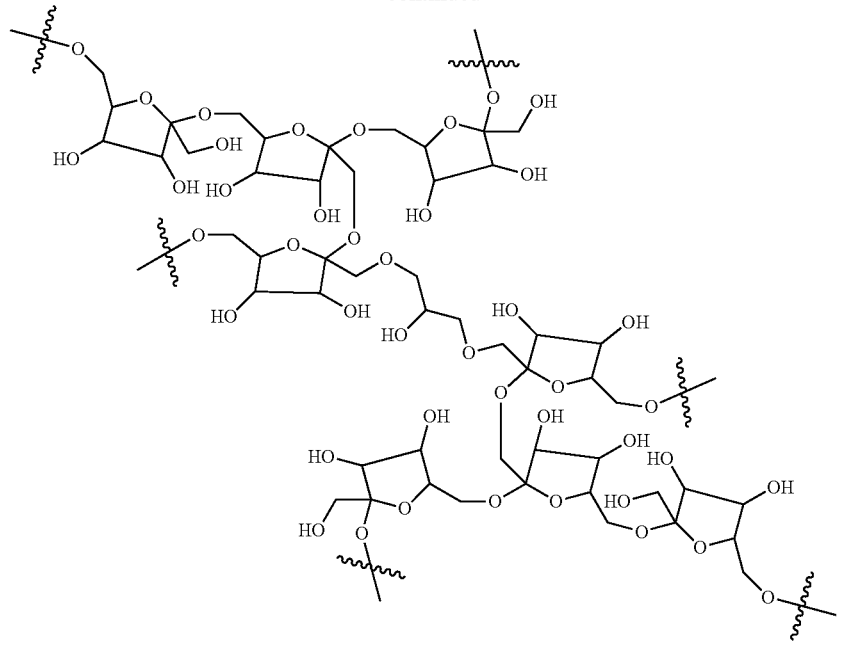

It is to be appreciated that crosslinking agents other than bis-epoxides and halohydrins may be used to affect crosslinking in some embodiments of the present disclosure. Suitable alternative crosslinking agents may include, but are not limited to mono-, di-, tri- or tetra-ethylene glycol diacrylate; mono-, di-, tri- or tetra-ethylene glycol dimethacrylate; and derivatives of methylenebisacrylamide.

The crosslinked polysaccharides described hereinabove may be combined with a clay material in certain polysaccharide compositions of the present disclosure. In some embodiments, the clay material may comprise a bentonite clay, a montmorillonite clay, or any combination thereof. In particular embodiments, the combination of a crosslinked polysaccharide and bentonite clay may define a binder composition suitable for aggregating particulate materials together. In still more particular embodiments, the crosslinked polysaccharide may be a crosslinked dextran, a crosslinked levan, a crosslinked guar, or any combination thereof.

In illustrative embodiments, polysaccharide compositions comprising a crosslinked polysaccharide may contain about 4 wt. % to about 85 wt. % crosslinked polysaccharide, with a clay material, particularly bentonite, comprising the balance of the polysaccharide composition. In more particular embodiments, the crosslinked polysaccharides may comprise about 10 wt. % to about 80 wt. %, or about 20 wt. % to about 70 wt. %, or about 25 wt. % to about 60 wt. % or about 15 wt. % to about 75 wt. %, or about 10 wt. % to about 80 wt. %, or about 40 wt. % to about 50 wt. %, or about 25 wt. % to about 50 wt. % of the polysaccharide composition. In other illustrative embodiments, clay materials, particularly bentonite clay, may be present in the polysaccharide compositions disclosed herein in an amount that is about 30 wt. % or less, or about 25 wt. % or less, or about 20 wt. % or less, or about 15 wt. % or less, or about 10 wt. % or less, or about 5 wt. % or less, or about 2 wt. % or less. In other embodiments, the clay materials may be present in the polysaccharide compositions in an amount of about 70 wt. % or above, or about 75 wt. % or above, or about 80 wt. % or above, or about 85 wt. % or above, or about 90 wt. % or above, or about 95 wt. % or above, or about 97 wt. % or above.

The polysaccharide compositions disclosed herein may be further formulated with a suitable liquid carrier, according to some embodiments. The liquid carrier may be water or a similar aqueous fluid in some embodiments. In more specific embodiments, the functionalized polysaccharide may have a concentration in the liquid carrier ranging between about 1 wt. % to about 25 wt. %, or between about 5 wt. % and about 20 wt. %, or between about 5 wt. % and about 15 wt. %, or between about 5 wt. % and about 10 wt. %.

In addition to the foregoing, any of the polysaccharide compositions disclosed herein may comprise additional components. Suitable additional components, particularly in polysaccharide compositions comprising a crosslinked polysaccharide and a clay material may include, for example, molasses, polyacrylamide, cellulose, synthetic cellulose derivatives, starch, modified starch, chloride salts (e.g., NaCl), iron sulfate, lime, calcium hydroxide, or any combination thereof. Suitable synthetic cellulose derivatives may include, for example, carboxymethyl cellulose. Modified starch compounds may be utilized similarly. Any of these additional components may be present in an amount up to 10 wt. % of the polysaccharide compositions.

In some or other embodiments, carbonates, bicarbonates, or soluble hydroxides of alkali metals such as sodium, lithium or potassium may be present in the polysaccharide compositions in an amount up to 20 wt. %. In more specific embodiments, the polysaccharide compositions may comprise about 0.5 wt. % to about 20 wt. %, or from about 5 wt. % to about 20 wt. %, or from about 7 wt. % to about 20 wt. % of the polysaccharide composition.

Accordingly, in some more specific embodiments, the present disclosure provides animal litter products having improved nuisance dust control features. In some embodiments, the animal litter products may comprise a particulate base litter material, and a polysaccharide composition coated upon the particulate base litter material, in which the polysaccharide composition comprises a crosslinked polysaccharide. In other embodiments, the animal litter product may comprise a particulate base litter material, and a polysaccharide composition coated upon the particulate base litter material, in which the polysaccharide composition comprises a clay material and a partially oxidized polysaccharide of the present disclosure. Additional details concerning suitable functionalized polysaccharides and clay materials are provided hereinabove.

Suitable particulate base litter materials may include one or more of clay particulates; vegetable matter such as grass, hay or alfalfa; wood particles such as wood chips, shavings or sawdust; or paper. Fines may be present in any of the particulate base litter materials. Additional components that may be present in any of the animal litter products disclosed herein include, for example, deodorizers, fragrances, clumping agents, superabsorbent polymers, enzymes and the like. Additional components that may be suitably included in the animal litter products of the present disclosure will be recognized by one having ordinary skill in the art.

According to various embodiments, the polysaccharide compositions may be formulated with a liquid carrier before being coated upon particulate base litter materials. The polysaccharide compositions may be combined with the particulate base litter material in an amount ranging between about 1 mL/ton and about 1000 mL/ton, or between about 20 mL/ton and about 500 mL/ton, or between about 50 mL/ton and about 250 mL/ton, or between about 75 mL/ton and about 150 mL/ton.

In other more specific embodiments, the present disclosure provides wood products having improved nuisance dust control features. In some embodiments, the wood products may comprise base wood particulates (including processed wood particulates, such as charcoal particulates), and a polysaccharide composition coated upon the base wood particulates, in which the polysaccharide composition comprises a functionalized polysaccharide. Suitable base wood particulates may include, for example, shavings, sawdust, bark, chips, or any combination thereof, and any of which may be compressed together in a pelletized form. The polysaccharide compositions may aid in holding the pelletized form together. Suitable functionalized polysaccharides, as well as further details concerning suitable polysaccharide compositions, are provided hereinabove. The type of wood comprising the base wood particulates is not considered to be especially limited.

According to various embodiments, the polysaccharide compositions may be formulated with a liquid carrier before being coated upon base wood particulates. The polysaccharide compositions may be combined with the base wood particulates in an amount ranging between about 1 mL/ton and about 10000 mL/ton, or between about 5 mL/ton and about 5000 mL/ton, or between about 10 mL/ton and about 1000 mL/ton, or between about 20 mL/ton to about 500 mL/ton, or between about 50 mL/ton to about 250 mL/ton, or between about 75 mL/ton and about 150 mL/ton, or between about 250 mL/ton and about 1500 mL/ton, or between about 500 mL/ton and about 1000 mL/ton.

According to still other embodiments, the present disclosure provides proppant particulates that are coated with any of the polysaccharide compositions disclosed herein. The coated proppant particulates may be utilized in various wellbore operations, such as fracturing operations conducted above a fracture gradient pressure of a subterranean formation penetrated by a wellbore. Wellbore operations conducted below the fracture gradient pressure using similarly coated particulate materials are also envisioned as well (e.g., for fluid loss control or diversion in conjunction with acidizing or permeability modification operations). In addition to mitigating dust formation from the proppant particulates, the polysaccharide compositions disclosed herein may promote stronger interaction between the individual proppant particulates in a plurality of proppant particulates. Thus, the polysaccharide compositions may facilitate formation of a proppant pack once the plurality of proppant particulates becomes seated within a fracture network. Further, the proppant particulates themselves may serve as a carrier for the polysaccharide composition coated thereon, which may facilitate treatment of a surface in the wellbore, such as the subterranean surface within a fracture network where the proppant particulates become disposed.

According to various embodiments, the polysaccharide compositions may be formulated with a liquid carrier before being coated upon proppant particulates. The polysaccharide compositions may be combined with the proppant particulates in an amount ranging between about 1 mL/ton and about 10000 mL/ton, or between about 5 mL/ton and about 5000 mL/ton, or between about 10 mL/ton and about 1000 mL/ton, or between about 20 mL/ton to about 500 mL/ton, or between about 50 mL/ton to about 250 mL/ton, or between about 75 mL/ton and about 150 mL/ton, or between about 250 mL/ton and about 1500 mL/ton, or between about 500 mL/ton and about 1000 mL/ton.

Accordingly, methods for utilizing coated particulates in a wellbore operation are also disclosed herein. The wellbore operation may be a fracturing operation, in more specific embodiments. In various embodiments, the methods may comprise providing proppant particulates, comprising sand or a ceramic, and having a polysaccharide composition coated thereon, in which the polysaccharide composition comprises a functionalized polysaccharide; introducing the proppant particulates into a wellbore; and interacting the functionalized polysaccharide with a surface in the wellbore, such as a formation surface in a plurality of fractures. The interaction between the functionalized polysaccharide and the surface in the wellbore may be a chemical interaction and/or a physical interaction, according to one or more embodiments. The proppant particulates may be introduced into the wellbore above a fracture gradient pressure of a subterranean formation penetrated by the wellbore, according to some embodiments. When the proppant particulates are introduced above the fracture gradient pressure, the methods may further comprise creating or extending the fracture network. In other embodiments, the proppant particulates, or similarly coated wellbore particulates, may be introduced to the wellbore below the fracture gradient pressure in other various types of wellbore operations such as fluid loss control, diversion, acidizing, permeability modification, and the like.

Embodiments disclosed herein include:

A. Coated particulates. The coated particulates comprise: a particulate material comprising sand or a ceramic; and a polysaccharide composition coated upon the particulate material, the polysaccharide composition comprising a functionalized polysaccharide.

B. Animal litter products. The animal litter products comprise: a particulate base litter material; and a polysaccharide composition coated upon the particulate base litter material, the polysaccharide composition comprising a crosslinked polysaccharide.

C. Animal litter products. The animal litter products comprise: a particulate base litter material; and a polysaccharide composition coated upon the particulate base litter material, the polysaccharide composition comprising a clay material and a partially oxidized polysaccharide formed from a parent polysaccharide comprising a plurality of monosaccharide rings, in which at least a portion of the monosaccharide rings are oxidatively opened in the partially oxidized polysaccharide.

D. Wood products. The wood products comprise: base wood particulates; and a polysaccharide composition coated upon the base wood particulates, the polysaccharide composition comprising a functionalized polysaccharide.

E. Fracturing methods. The fracturing methods comprise: providing proppant particulates, comprising sand or a ceramic, and having a polysaccharide composition coated upon thereon, the polysaccharide composition comprising a functionalized polysaccharide; introducing the proppant particulates into a wellbore; and interacting the functionalized polysaccharide with a surface in the wellbore.

F. Foundry moulds comprising coated the coated particulates of embodiment A.

Embodiments A-F may have one or more of the following additional elements in any combination.

Element 1: wherein the functionalized polysaccharide comprises a partially oxidized polysaccharide; wherein the partially oxidized polysaccharide is formed from a parent polysaccharide comprising a plurality of monosaccharide rings, and at least a portion of the monosaccharide rings are oxidatively opened in the partially oxidized polysaccharide.

Element 2: wherein the partially oxidized polysaccharide is functionalized with one or more amine groups at a site of oxidative opening.

Element 3: wherein the functionalized polysaccharide comprises a functionalized dextran, a functionalized levan, a functionalized guar, or any combination thereof.

Element 4: wherein the polysaccharide composition further comprises a clay material.

Element 5: wherein the clay material comprises bentonite.

Element 6: wherein the particulate material is foundry sand.

Element 7: wherein the functionalized polysaccharide comprises a crosslinked polysaccharide.

Element 8: wherein the crosslinked polysaccharide comprises a crosslinked dextran, a crosslinked levan, a crosslinked guar, or any combination thereof.

Element 9: wherein the particulate base litter material comprises a clay material.

Element 10: wherein the base wood particulates comprise charcoal particulates.

Element 11: wherein the proppant particulates are introduced into the wellbore above a fracture gradient pressure of a subterranean formation penetrated by the wellbore.

Element 12: wherein the proppant particulates are disposed in a plurality of fractures in a subterranean formation penetrated by the wellbore, the functionalized polysaccharide interacting with a formation surface in the plurality of fractures.

By way of non-limiting example, exemplary combinations applicable to A, E and F include: 1 and 2; 1 and 3; 1 and 4; 1, 4 and 5; 1, 2 and 7; 1 and 6; 3 and 4; 3, 4 and 5; 3 and 6; 4 and 6; 7 and 8; 4 and 7; 4, 5 and 7; 6 and 7; and 4-7. Exemplary combinations applicable to B include: 4 and 9; 5 and 9; 4, 5 and 9; and 8 and 9. Exemplary combinations applicable to C include: 2 and 3; 2 and 5; 2 and 9; and 5 and 9. Exemplary combinations applicable to D include: 1 and 2; 1 and 3; 1 and 4; 1, 4 and 5; 1, 2 and 7; 3 and 4; 3, 4 and 5; 7 and 8; 4 and 7; 4, 5 and 7; 1 and 10; 1, 2 and 10; 3 and 10; 4 and 10; 4, 5 and 10; 7 and 10; and 7, 8 and 10.

To facilitate a better understanding of the embodiments described herein, the following examples of various representative embodiments are given. In no way should the following examples be read to limit, or to define, the scope of the invention.

EXAMPLES

Dextran was reacted with sodium periodate in water at room temperature (about 20° C.-22° C.) to produce partial oxidation of the monosaccharide units in the polymer chain. To the resulting dialdehyde was then added ethylenediamine in water at room temperature, and the intermediate imine was then reacted with sodium borohydride, again in water and at room temperature. A compound similar to that shown in Formula 1 above was formed in the reaction sequence. Levan and guar were functionalized similar to form compounds similar to those shown in Formulas 2 and 3 above.

Unless otherwise indicated, all numbers expressing quantities and the like in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating various features are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While various systems, tools and methods are described herein in terms of "comprising" various components or steps, the systems, tools and methods can also "consist essentially of" or "consist of" the various components and steps.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Therefore, the disclosed systems, tools and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems, tools and methods illustratively disclosed herein may suitably be practiced in the absence of any element that is not specifically disclosed herein and/or any optional element disclosed herein. While systems, tools and methods are described in terms of "comprising," "containing," or "including" various components or steps, the systems, tools and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is:

1. An animal litter product comprising:
a particulate base litter material; and
a polysaccharide composition coated upon the particulate base litter material, the polysaccharide composition comprising a clay material and a partially oxidized polysaccharide formed from a parent polysaccharide comprising a plurality of monosaccharide rings, in which at least a portion of the monosaccharide rings are oxidatively opened in the partially oxidized polysaccharide.

2. The animal litter product of claim 1, wherein the clay material comprises bentonite.

3. The animal litter product of claim 1, wherein the partially oxidized polysaccharide is functionalized with one or more amine groups at a site of oxidative opening.

4. The animal litter product of claim 1, wherein the partially oxidized polysaccharide comprises a functionalized dextran, a functionalized levan, a functionalized guar, or any combination thereof.

5. The animal litter product of claim 1, wherein the particulate base litter material comprises a clay material.

6. A wood product comprising:
base wood particulates; and
a polysaccharide composition coated upon the base wood particulates, the polysaccharide composition comprising a functionalized polysaccharide;
wherein the functionalized polysaccharide comprises a partially oxidized polysaccharide formed from a parent polysaccharide comprising a plurality of monosaccharide rings, and at least a portion of the monosaccharide rings are oxidatively opened in the partially oxidized polysaccharide.

7. The wood product of claim 6, wherein the partially oxidized polysaccharide is functionalized with one or more amine groups at a site of oxidative opening.

8. The wood product of claim 6, wherein the partially oxidized polysaccharide comprises a functionalized dextran, a functionalized levan, a functionalized guar, or any combination thereof.

9. The wood product of claim 6, wherein the polysaccharide composition further comprises a clay material.

10. The wood product of claim 9, wherein the clay material comprises bentonite.

11. The wood product of claim 6, wherein the base wood particulates comprise charcoal particulates.

* * * * *